United States Patent [19]

Lobel et al.

[11] 4,206,856

[45] Jun. 10, 1980

[54] LIQUID SEPARATING VESSEL

[76] Inventors: Stanley Lobel, 30 E. Wind Rd., Yonkers, N.Y. 10710; Leon Lobel, 110 Campbell St.; Herbert I. Schachter, 86 Campbell St., both of New Hyde Park, N.Y. 11040

[21] Appl. No.: 943,113

[22] Filed: Sep. 18, 1978

[51] Int. Cl.² .................... B01D 12/00; B01D 17/00; B67D 3/00
[52] U.S. Cl. ................................... 222/564; 210/514
[58] Field of Search ............... 210/514; 222/81, 189, 222/465, 564, 547, 317

[56] References Cited

U.S. PATENT DOCUMENTS

| 361,352 | 4/1887 | Donovan | 222/564 X |
|---|---|---|---|
| 960,492 | 6/1910 | Brisner | 210/514 |
| 1,146,573 | 7/1915 | Jacobs | 210/514 X |
| 1,228,665 | 6/1917 | Griffin | 222/564 X |

FOREIGN PATENT DOCUMENTS 954160 12/1949 France ..................... 210/514

*Primary Examiner*—David A. Scherbel
*Attorney, Agent, or Firm*—Anthony H. Handal

[57] ABSTRACT

A liquid separating vessel which comprises an interior volume, a portion of which is taken up by a conduit is disclosed. The conduit extends from the top of the vessel to the bottom of the vessel. The conduit is defined between a portion of the sidewall of the vessel and a conduit-defining baffle. The baffle may be removed for easy cleaning. Structure is provided for preventing overflow when the vessel is completely filled with liquid and tilted.

6 Claims, 5 Drawing Figures

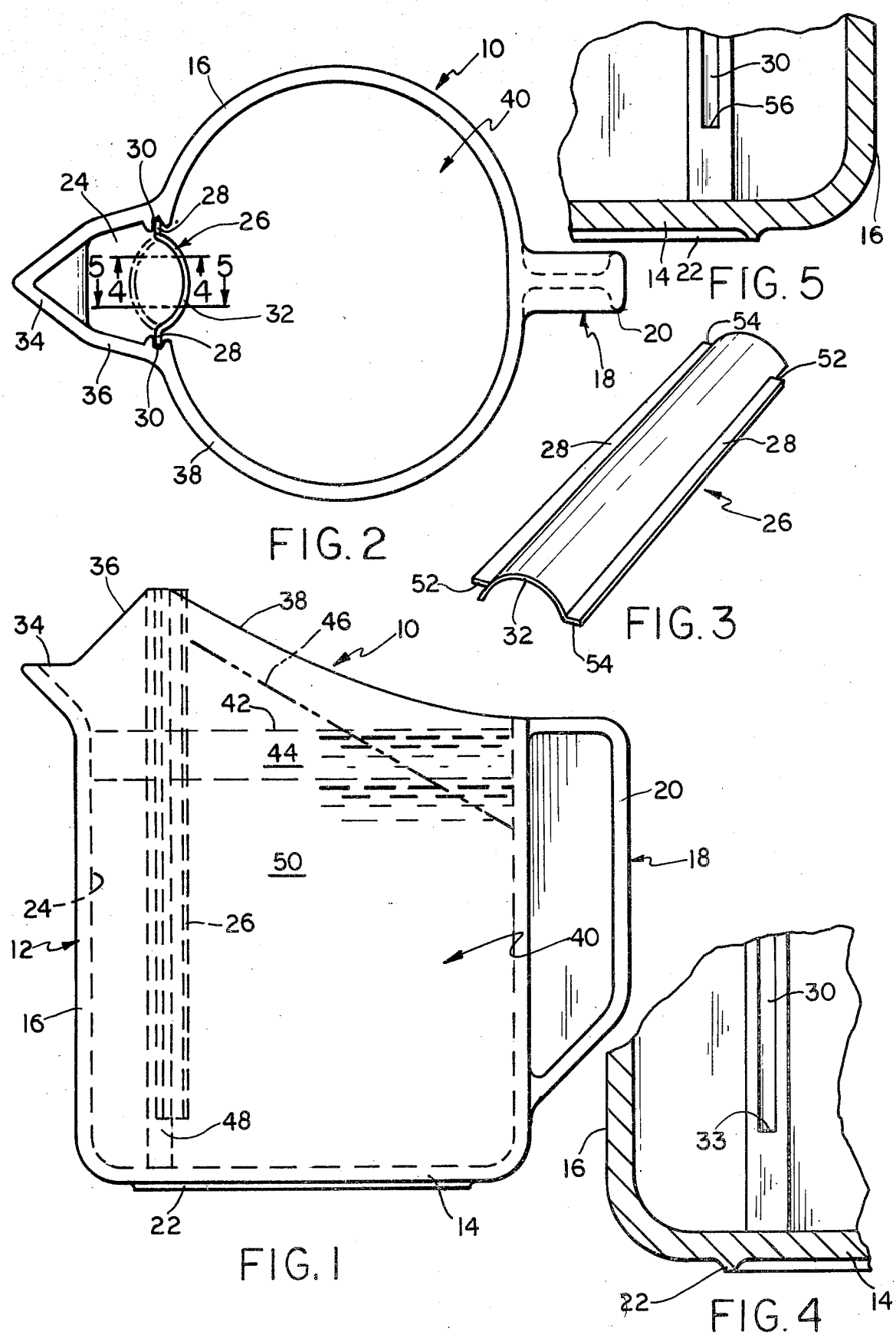

LIQUID SEPARATING VESSEL

BACKGROUND OF THE INVENTION

In the past, a great deal of work has been devoted to the development of an effective vessel for the household separation of immisable liquids which are usually found mixed together, such as fat and gravy or cream and milk.

One such device is disclosed in U.S. Pat. No. 1,121,993 to Eichler. In accordance with the construction disclosed there, a vessel is provided with a spout which is fed by an elongated conduit which extends to the bottom of the vessel. The elongated conduit communicates with the inside of the vessel only through its lowermost extremity. Accordingly, only the liquid at the bottom of the vessel may enter the conduit and exit through the spout.

In use, the heavier liquid, such as the milk in a milk and cream mixture, settles to the bottom of the vessel. When the vessel is tilted the heavier milk exits through the spout until most of the milk is exhausted from the vessel and mostly cream remains. Likewise, if a mixture of gravy and fat is put in the vessel, the gravy may be poured out, leaving most of the fat behind.

Still another device is disclosed in U.S. Pat. No. 2,583,335 to Jepson. This device is similar to the one disclosed by Eichler in both configuration and operation. Jepson's device also includes sidewalls which extend above the main body portion of the vessel adjacent to the spout in order to prevent any spilling of the liquid in the vessel when the vessel is tilted to the pouring position.

However, both of these devices suffer from a number of problems. For example, cleaning of the spout which feeds the conduit is difficult without a special implement, such as a slender bottle brush. Likewise, because of the shape of the vessels, both of these vessels are rather expensive to manufacture. In accordance with the present invention these and other disadvantages of the prior art are eliminated.

SUMMARY OF THE INVENTION

In accordance with the present invention, the inventive vessel comprises a bottom and a sidewall. The sidewall extends up from the perimeter of the bottom to define the interior volume of the vessel. Means are provided on the sidewall for engaging a baffle which is in removeable engagement with the sidewall and together with the sidewall defines a conduit within the interior volume of the vessel. The baffle extends from the top of the sidewall to a point spaced from the bottom of the vessel to define an orifice for the entry of liquid from the remainder of the interior volume into the conduit. The intersection of the conduit and a plane parallel to the bottom of the vessel is much smaller in area than the intersection of the remainder of the interior volume of the vessel and the plane.

BRIEF DESCRIPTION OF THE DRAWINGS

FIG. 1 is a front elevational view of the inventive liquid separating vessel;

FIG. 2 is a top plan view of the liquid separating vessel illustrated in FIG. 1;

FIG. 3 is a perspective view of a conduit defining baffle employed in the inventive liquid separating vessel;

FIG. 4 is a partial view in cross-section along lines 4—4 of FIG. 2 when the baffle illustrated in FIG. 3 has been removed to expose the baffle engaging structure; and FIG. 5 is a view similar to that of FIG. 4 along lines 5—5 of FIG. 3.

DETAILED DESCRIPTION OF THE PREFERRED EMBODIMENT

Referring to FIG. 1, the inventive liquid separating device 10 comprises a generally cylindrically-shaped vessel 12 having a bottom 14 and a sidewall 16. Secured to sidewall 16 is a handle 18 which is provided with a griping rim 20. In the event that the separating vessel is placed on a surface upon which a liquid has been spilled, the excessive transfer of the spilled liquid to other surfaces upon which the vessel is placed is prevented by an annular ridge 22 on the bottom of the vessel.

The sidewall of the vessel together with its bottom thus define an interior volume for the containment of liquid to be separated. A portion of this interior volume is apportioned to a conduit 24 which is defined partly by a conduit-defining baffle 26 (FIGS. 2 and 3) and partly by sidewall 16. Baffle 26 includes a pair of rails 28 which mate with a pair of grooves 30 (FIG. 4) in sidewall 16. Baffle 26 also includes a generally curved portion 32 which allows the baffle to be flexibly compressed and jam-fitted into grooves 30. In accordance with the preferred embodiment, the distance between the two rails 28 is slightly larger than the distance between grooves 30. Accordingly, when baffle 26 is compressed and jam-fitted between grooves 30, the baffle securely and springingly engages the grooves. Grooves 30 each include a seat 33. When baffle 26 is inserted into grooves 30, it slidingly advances until the bottom of the baffle is in abutting relationship to seat 33. This assures that the baffle will be positioned for proper operation of the inventive liquid separating vessel.

A portion of sidewall 16 defines a spout 34. The portion 36 of sidewall 16, which is adjacent baffle 26 on the side of spout 34, extends to a greater distance from base 14 than that portion of the sidewall adjacent the handle. Likewise, portion 38 of sidewall 16, on the side of the baffle opposite the spout, also extends a greater distance from the base. This has the effect of increasing the size of the remaining portion 40 of the interior volume of the vessel defined by that portion of sidewall 16 opposite spout 34 and baffle 26. Thus, if the vessel is filled to the level of surface 42 of lighter liquid 44 and the vessel is tilted to pour liquid from the spout 34, the top surface of liquid 44 will be as is generally indicated by the dashed line 46 and the liquid will not spill over the edge of the vessel. Portion 38 thus allows the separator to be filled to capacity and still be operative. Portion 36 serves the function of lending strength to upper portion 38 of sidewall 16, especially during insertion and removal of baffle 26.

Baffle 26 extends from the top of portions 36 and 38 of sidewall 16 to a point spaced from the bottom 14 of vessel 10. Orifice 48 is thus defined between the bottom of baffle 26 and the bottom 14 of the vessel. Thus, liquid is permitted to flow through the orifice from remaining volume 40 through conduit 24 and out spout 34. The orifice is of such size that lumps of meat or other particles or solids in the liquid to be separated are permitted to pass through orifice 48 into conduit 24. Alternatively, if it is contemplated that the separating vessel will be used for relatively clarified liquids, such as milk mixed with cream or gravy and fat mixtures which have been strained, orifice 48 may be relatively narrow compared to the size of the orifice which is illustrated in FIG. 4.

When it is desired to use the inventive vessel 10 to separate two liquids, such as fat mixed with gravy (typically gravy comprises a water solution and suspension of particles of meat and other meat-derived substances), the mixed liquid is poured into the remaining volume 40 of separating vessel 10. If the gravy and fat are not already mixed, the pouring operation usually has the effect of creating a great deal of turbulence which results in substantially mixing the two components together. If the liquid is allowed to settle for a time, the fat 44 will rise to the top of both the conduit 24 and the remaining volume 40. Likewise, the gravy 50 will stratify in a layer underneath the fat 44. This is because the water solution of the gravy is substantially heavier than fat. It is noted that such separation will occur both in conduit 24 and remaining volume 40.

The vessel may then be tilted in such a manner that spout 34 is lower than handle 18. The relatively small amount of fat 44 in conduit 24 may then, together with gravy 50 be poured into a receiving vessel. Because this small amount of fat will be poured out first, conduit 24 should be much smaller in volume than the remaining volume. As the separating vessel 10 is tilted, gravy 50 in the remaining volume 40 of the vessel will enter conduit 24 via orifice 48. The vessel would then be tilted to a greater degree continuously until most of the gravy 50 has exited through conduit 24 and spout 34 into the receiving vessel and only a small amount of gravy remains with the fat 44. The liquid remaining in the vessel may then be discarded. Alternatively, it may be added to a remaining non-separated portion of the liquid to be separated out again. It may also be desirable to save the fat for cooking or other uses.

The shape and construction of the inventive liquid separating vessel has a number of advantages. In particular, it is noted that because the sidewall extends substantially vertically and never extends over areas of the bottom inside the perimeter of the bottom, it is a practical and inexpensive form to fabricate from plastic. Likewise, when it is desired to clean the gravy separating vessel, the baffle may be conveniently pulled out and cleaned together with the vessel without the use of specialized cleaning hardware.

Baffle 26 is provided with a pair of indentations 52. When the baffle is in place as shown in solid lines in FIG. 2, these indentations are not functional because one of the tips 54 of baffle 26 is in abutting relationships with seat 33. If on the other hand the baffle is inserted into the vessel in the position shown in phantom lines in FIG. 2, one of the tips 54 abuts seat 56, which is closer to the bottom than seat 33, and one of the indentations 52 abuts seat 33. Baffle 26 thus sets lower when it is in the position illustrated in phantom in FIG. 2. The passage leading to the spout is also smaller in this position and the device is thus more suited to separating particle free solutions, while in the other position liquids with lumps are more advantageously separated.

While an illustrative embodiment of the invention has has been described, various modifications will be obvious to those of skill in the art. For example, ridge 22 on the bottom of the vessel may be made discontinuous and the shape of the baffle may be made rectangular. Such modifications are within the spirit and scope of the invention which is limited and defined only by the appended claims.

What we claim is:

1. A gravey separating vessel comprising a bottom and a sidewall, said sidewall extending up from the perimeter of said bottom to define the interior volume of the vessel, first engagement means disposed on said sidewall, seat means positioned with respect to said first engagement means in such a manner that an element engaging said first engagement means will have its downward movement limited to a minimum distance from said bottom; a baffle positioned, configured and dimensioned to define, together with a portion of said sidewall, a conduit within a portion of said interior volume; first mating means positioned on said baffle and configured and dimensioned to engage said first engagement means and said seat means in such a manner that when said first mating means is in engagement with said seat means said baffle is disposed a first distance from said bottom and defines an orifice of first size communicating with said conduit and adjacent said bottom; and second mating means positioned on said baffle and configured and dimensioned in such a manner that when said baffle is removed and said second mating means is put into engagement with said first engagement means and said seat means, said baffle is disposed a second distance from said bottom and defines an orifice of second size, said orifice of second size and said orifice of first size being relatively small compared to the height of said sidewall.

2. A vessel as in claim 1, wherein said conduit communicates with a spout means and said first size is larger than said second size and said baffle is so configured and dimensioned that, when said first mating means is in engagement with said first engagement means, said baffle at points removed from said engagement means extends away from said spout means and said conduit is larger than the conduit defined when said first mating means is in engagement with said second engagement means.

3. A vessel as in claim 2, wherein said baffle has a length longer than its width and said first and second mating means are disposed on one of its long sides.

4. A vessel as in claim 2 further comprising second engagement means disposed on said sidewall and wherein said baffle is substantially rectangular in shape with two long sides and two short sides, and said first and second mating means are disposed on opposite long sides of said baffle, adjacent one of said short sides, and further comprising third mating means disposed on the long side opposite the long side on which said first mating means is disposed and adjacent the short side opposite the short side adjacent which said first mating means is disposed, said third mating means being configured and dimensioned in such a manner that when it is adjacent said seat means the baffle defines a relatively large orifice and a relatively large conduit, and a fourth mating means disposed on the long side opposite the long side on which said second mating means is disposed and adjacent the short side opposite the short side adjacent which said second mating means is disposed, said forth mating means being configured and dimensioned in such a manner that when it is adjacent said seat means the baffle defines a relatively small orifice and a relatively small conduit, said first, second, third and fourth mating means each mating with each of said first and second engagement means.

5. A vessel as in claim 2, wherein the projection of said sidewall in a plane substantially containing said bottom does not extend into the inside area defined by the perimeter of said bottom and wherein that portion of said sidewall adjacent said baffle and opposite said conduit extends a greater distance from said bottom than portions of said sidewall opposite to said conduit and relatively more removed from said baffle, and wherein said baffle extends from a point on said sidewall which is removed from said bottom by a distance which is relatively large compared to other points on the top of said sidewall.

6. A vessel as in claim 1 wherein said first engagement means comprises grooves which are disposed on the interior of the vessel.

* * * * *